No. 12,123. REISSUED JUNE 16, 1903.

W. W. COREY.

AUTOMATIC DRAIN VALVE FOR VALVES AND FIRE HYDRANTS.

APPLICATION FILED OCT. 24, 1902.

Witnesses:
G. A. Pennington
Ralph Kalich

Inventor:
William W. Corey,
by Bakewell & Connally
Attys.

No. 12,123.

Reissued June 16, 1903.

UNITED STATES PATENT OFFICE.

WILLIAM W. COREY, OF ST. LOUIS, MISSOURI.

AUTOMATIC DRAIN-VALVE FOR VALVES AND FIRE-HYDRANTS.

SPECIFICATION forming part of Reissued Letters Patent No. 12,123, dated June 16, 1903.

Original No. 678,545, dated July 16, 1901. Application for reissue filed October 24, 1902. Serial No. 128,673.

DIVISION B.

*To all whom it may concern:*

Be it known that I, WILLIAM W. COREY, a citizen of the United States, residing at St. Louis, Missouri, have invented a certain new and useful Improvement in Automatic Drain-Valves for Valves and Fire-Hydrants, of which the following is a full, clear, and exact description, such as will enable others skilled in the art to which it appertains to make and use the same, reference being had to the accompanying drawings, forming part of this specification, in which—

Figure 1:
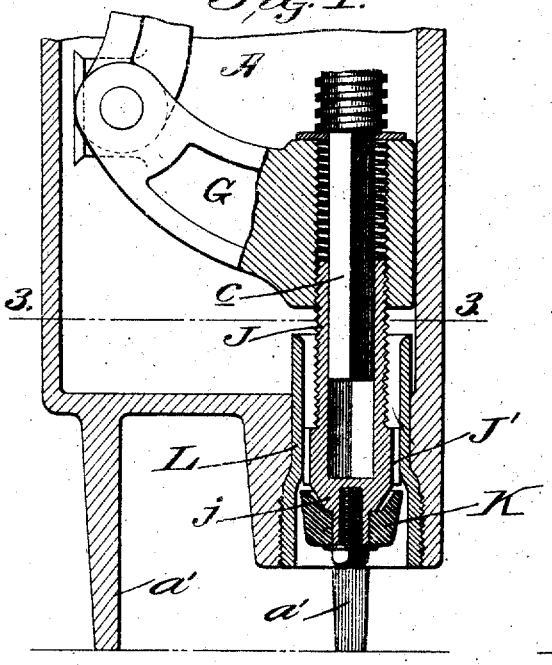
Figure 2:
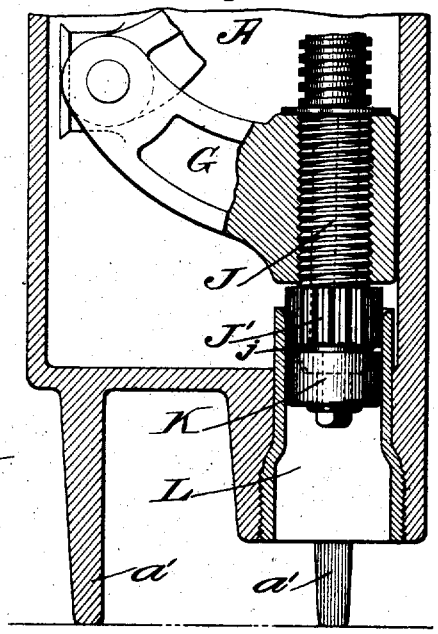
Figure 3:
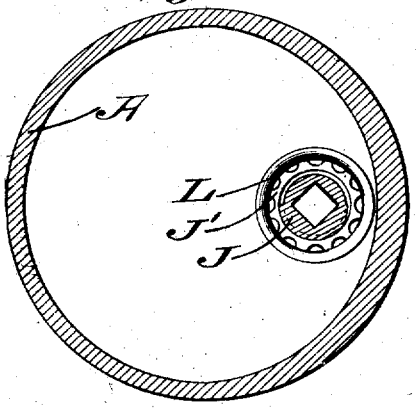

Figure 1 is a vertical sectional view through my improved drain-valve in position in a fire-hydrant. Fig. 2 is a similar view showing the valve in side elevation and in a changed position, and Fig. 3 is a sectional view on the line 3 3 of Fig. 1.

This invention relates to a new and useful improvement in drain-valves designed particularly for use in connection with valves and fire-hydrants, the object being to so construct the valve that it will be quick in action, said valve enduring movements to which it is subjected with little or no wear.

The construction of the drain-valve herein shown is the same as that shown and described in United States Letters Patent No. 678,545, dated July 16, 1901, which patent has been surrendered for reissue and of which reissue application this present application is a division. While my improved valve is capable of being used in connection with the main valve shown in my aforesaid patent, No. 678,545, it is obvious that the said drain-valve can be used in connection with other forms of main valves and be operated in a different manner and by different means than are described in said patent.

In the drawings I have shown the lower portion only of a stand-pipe (indicated at A) and in which is arranged a stationary nut G, said nut being interiorly threaded and coöperating with the threads on the valve-stem J. This valve-stem is provided with a non-circular opening and receives the squared shank *c* of the rod which operates the mechanism connected to the main valve. (Not here shown.) When this squared shank *c* is rotated, the valve-stem J will be correspondingly rotated and by reason of its threaded connection with the stationary nut G will be raised or lowered, depending upon the direction of rotation, the squared shank *c* being received in or withdrawn from the bore of the valve-stem J.

J′ indicates a head on the lower end of valve-stem J, which head is provided with grooves to permit the passage of water therebeyond, said head serving as a guiding-spider for the drain-valve.

K indicates the drain-valve proper, which is preferably made up of rubber, leather, or other suitable material, said valve being cup-shaped and fitting upon a conical projection *j* on the lower end of the drain-valve stem. This drain-valve is so arranged that water may enter in its pocket for the purpose of causing the flanges of said valve to contact with the walls of the valve-casing, in which it is mounted, for the purpose of making a water-tight joint. The drain-valve is held in position by a suitable screw-bolt and washer, as is well understood.

L indicates a casing for the drain-valve, which is in the form of a thimble or sleeve, the upper end of which opens into the stand-pipe and is of relatively small diameter, corresponding to the diameter of the drain-valve K, while the lower end opens into the exterior and is of relatively large diameter, so as to permit water from the interior of the stand-pipe to pass therearound in its escape. This sleeve L is preferably threaded into an appropriate boss extending from the bottom wall of the stand-pipe. It is well known that the purpose of this drain-valve is to enable the water left in the stand-pipe when the main valve is closed to escape to the exterior, so that in winter the hydrant will not be rendered inoperative by ice. Another object is to provide a vent for the water when the main valve is closed, so that the moving parts will be relatively dry. These fire-hydrants are usually buried in the ground to such a depth as to avoid the freezing of any water which may remain in the lower part thereof, and therefore this drain-valve in providing an opening for the escape of water remaining in the stand-pipe merely offers a leakage to said water, the water in passing out of the stand-pipe to the exterior seeping into the ground.

The legs $a'$ (shown on the bottom of the stand-pipe) are present for the purpose of guarding the drain-valve boss in transportation, &c.

Heretofore the drain-valves used in hydrants of this class have been most generally employed to control lateral openings in the valve-casing; but this form of construction I have found to be objectionable, because the lateral openings will cut the rubber valve, and in addition the required distance said valve must travel to bring it below the lateral openings prevents an immediate tight valve, as in the present construction, and will also cause the escaping water to travel a tortuous path. In my present construction the drain-valve merely serves to close an open-ended cylinder, and, as shown in Fig. 1, it will be noticed that as soon as the main-valve rod is rotated and before the main valve has opened to any great extent the upper end of the drain-valve has entered the reduced bore of the casing. Of course the water coming into the stand-pipe will first fill the lower end thereof and in so doing will pass beyond the grooved head J' and be received by the cup-shaped drain-valve. The pressure of the water on top of this valve will force its flanges outwardly, so as to make a water-tight joint with the casing, which prevents the water from passing to the exterior. Of course as the valve-rod is operated to open the main valve to its full extent this drain-valve is elevated; but the sleeve L affords plenty of room for such travel of the drain-valve, said drain-valve in all of its positions in the contracted portion of the sleeve from the time the free edges meet with resistance at the smaller bore of the cylinder making a water-tight joint under pressure to prevent the escape of the water in the stand-pipe while the main valve is open, as shown in Fig. 2. When the main valve is closed, as shown in Fig. 1, the drain-valve occupies a position in the enlarged portion of the valve-casing, permitting the water passing through the grooves of the head J' to find an escape at all points around the drain-valve, the water traveling in a relatively straight path in finding such escape. Where the water can pass to the exterior on all sides of the drain-valve, the stand-pipe will be emptied in a much shorter space of time with less travel of the drain-valve from its point of contact for closing than would be the case where a series of small openings are arranged in the sleeve L, the drain-valve passing above or below said openings in its control thereof.

It will be noticed that the sleeve or barrel L is provided with bores of different diameters which are connected by a curved or inclined shoulder. The purpose of this is to draw in the free edges of the cup-shaped drain-valve when said valve passes from the larger bore into the smaller. To accommodate this contraction of the free edges of the cup, the projection $j$ on the lower end of the drain-valve stem is somewhat smaller in diameter than the interior faces of the cup, as shown in Fig. 1. Thus when the valve is in the larger bore the resiliency of the cup is such as to cause the free edges thereof to flare slightly in an outward direction, and when the valve is raised these free edges come in contact with the curved shoulder in the barrel, and the cup in being forced into the smaller bore has these free edges contracted, so that a tight fit is immediately made not only by contracting the free edges of the cup-shaped valve, but by the action of the water-pressure on said cup, so that while the use of the cup form is to secure a valve of much larger diameter than the small bore of the cylinder, in order that more allowance might be made for wear of the valve, the action of the water-pressure will cause the valve to be tight after it has worn to the actual size of the bore of the cylinder.

The particular construction of my improved drain-valve is not affected in any way by the means employed for moving the valve, and in the following claims I do not wish to be limited to any particular means for operating said drain-valve except as such means are expressly set forth in the claims.

I am aware that many minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. A drain-valve having a barrel with sections of different diameters and a cup-shaped valve having a resilient free edge movable from one section of the barrel to the other section of the barrel and arranged so that the free edge first enters the section of smaller diameter when the valve is moved from the section of larger diameter for closing the opening through the barrel; substantially as described.

2. A drain-valve having a barrel with sections of different diameters the walls of one section tapering or curving toward the walls of the other section, and a cup-shaped valve having a resilient free edge movable from one section of the barrel to the other section of the barrel and arranged so that the free edge first enters the section of smaller diameter when the valve is moved from the section of larger diameter for closing the opening through the barrel; substantially as described.

3. In a drain-valve, the combination with a barrel having two diameters, of a valve-stem having a guiding-spider operating in the bore of smaller diameter, and a cup-shaped drain-valve mounted on said stem and designed to pass from the bore of smaller diameter into the bore of larger diameter, and vice versa, said drain-valve, when in the bore of larger diameter, having its free edges presented toward the bore of smaller diameter; substantially as described.

4. In a drain-valve, the combination with a barrel having bores of different diameters, a valve-stem having a spider-head fitting in the bore of smaller diameter, means for raising and lowering said valve-stem, and a cup-shaped drain-valve mounted on said valve-stem, said drain-valve, when in the bore of larger diameter, having its free edges presented toward the bore of smaller diameter; substantially as described.

5. In a drain-valve, the combination with a barrel L having two diameters, the larger of which is at the bottom portion of said barrel, a valve-stem provided with a guiding-spider which operates in the smaller bore only of said barrel, a cup-shaped drain-valve mounted on the lower end of said stem and having its free edges presented upwardly, whereby when the said drain-valve moves from its position in the larger bore to its position in the smaller bore the free edges of said cup-shaped valve will be forced inwardly by the smaller bore, a clearance being provided to permit the inward movement of these free edges, and means for raising and lowering said drain-valve; substantially as described.

6. In a drain-valve, the combination with a stand-pipe having a boss in its bottom wall, of an open-ended cylinder or barrel arranged in said boss and having a bore of different diameters, a valve-stem, a spider-head for guiding said stem in its movement, and a cup-shaped drain-valve K mounted on the lower end of said stem and adapted, in one position, to fit snugly in the reduced bore of the open-ended cylinder and in another position to be located in the enlarged bore of said open-ended cylinder, whereby in said latter position, a space is provided around said drain-valve for the passage of water; substantially as described.

7. In a hydrant, the combination with a stand-pipe, of a valve-operating rod provided with a non-circular shank, a drain-valve stem mounted upon said shank and threaded into a stationary nut, and an open-ended cylinder having bores of different diameters with which the drain-valve coöperates; substantially as described.

8. In a hydrant, the combination with a stand-pipe, of a valve-operating rod having a non-circular shank at its lower end, a stationary nut through which said shank passes, a drain-valve stem threaded in said nut and receiving said non-circular shank, a spider-head on the lower end of said drain-valve stem, a cup-shaped drain-valve mounted upon the stem below said spider-head, and an open-ended cylinder having bores of different diameters for coöperating with said drain-valve; substantially as described.

9. In a hydrant, the combination with a stand-pipe having a boss in its bottom wall, of an open-ended cylinder arranged in said boss and having a bore of different diameters, a valve-operating rod having a non-circular shank *c*, a stationary nut through which said shank passes, a drain-valve stem J, a spider-head J′ for guiding said stem in its movement, and a cup-shaped drain-valve K mounted upon the lower end of said stem, and adapted, in one position, to fit snugly in the reduced bore of the open-ended cylinder, and in another position to be located in the enlarged bore of said open-ended cylinder whereby, in said latter position, a space is provided around said drain-valve for the passage of water; substantially as described.

In testimony whereof I hereunto affix my signature, in the presence of two witnesses, this 20th day of October, 1902.

WILLIAM W. COREY.

Witnesses:
GEORGE BAKEWELL,
G. A. PENNINGTON